(12) United States Patent
Liang et al.

(10) Patent No.: US 9,864,402 B1
(45) Date of Patent: Jan. 9, 2018

(54) PORTABLE ELECTRONIC DEVICE CAPABLE OF PREVENTING A DISPLAY FROM FALLING

(71) Applicant: Wistron Corporation, New Taipei (TW)

(72) Inventors: Chen-Yi Liang, New Taipei (TW); Ming-Ju Hsieh, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 15/427,024

(22) Filed: Feb. 7, 2017

(30) Foreign Application Priority Data

Oct. 14, 2016 (TW) .............................. 105133192 A

(51) Int. Cl.
| | |
|---|---|
| *G06F 1/16* | (2006.01) |
| *G06F 1/18* | (2006.01) |
| *H01F 7/06* | (2006.01) |
| *H01F 7/02* | (2006.01) |
| *A45C 11/00* | (2006.01) |
| *F16M 11/06* | (2006.01) |
| *F16M 11/04* | (2006.01) |

(52) U.S. Cl.
CPC .......... *G06F 1/1616* (2013.01); *G06F 1/1677* (2013.01); *G06F 1/1679* (2013.01); *G06F 1/1681* (2013.01); *G06F 1/189* (2013.01); *H01F 7/0252* (2013.01); *H01F 7/064* (2013.01); *A45C 2011/003* (2013.01); *F16M 11/04* (2013.01); *F16M 11/06* (2013.01)

(58) Field of Classification Search
CPC .... G06F 1/1681; G06F 1/1616; G06F 1/1626; G06F 1/1632; G06F 1/189; G06F 1/1679; G06F 1/1677; G06F 1/166; G06F 1/1633; A45C 2011/003; H01F 7/0252; H01F 7/064; H05K 5/0234; F16M 11/04; F16M 11/06; F16M 11/10; F16M 13/005; A47B 23/043
See application file for complete search history.

(56) References Cited

U.S. PATENT DOCUMENTS

| | | | | |
|---|---|---|---|---|
| 6,366,440 B1* | 4/2002 | Kung | ...................... | E05C 19/16 361/147 |
| 8,861,212 B2* | 10/2014 | Li | .......................... | G06F 1/1637 361/728 |

(Continued)

*Primary Examiner* — Dimary Lopez Cruz
*Assistant Examiner* — Abhishek Rathod
(74) *Attorney, Agent, or Firm* — Winston Hsu

(57) ABSTRACT

A portable electronic device utilizes a control unit for controlling a power unit to provide electricity for an electromagnetic component to generate a first active magnetic property for magnetically repulsing or magnetically attracting a moving magnetic component with a first magnetic property, so as to drive the moving magnetic component to move to a first position when the control unit determines an included angle between a first module and a second module is greater than a predetermined angle. When the moving magnetic component is located at the first position, a pivoting mechanism disposed between a supporting frame and the second module drives the supporting frame to pivotally unfold relative to the second module, so as to support the second module on a supporting surface, which prevents the second module from falling.

12 Claims, 9 Drawing Sheets

(56) References Cited

U.S. PATENT DOCUMENTS

| | | | | |
|---|---|---|---|---|
| 8,934,221 B2* | 1/2015 | Guo | F16M 11/10 | |
| | | | 248/229.22 | |
| 9,057,213 B2* | 6/2015 | Lai | E05D 7/00 | |
| 9,110,636 B2* | 8/2015 | Shen | G06F 1/1616 | |
| 9,489,054 B1* | 11/2016 | Sumsion | G06F 3/0208 | |
| 9,532,631 B2* | 1/2017 | Gu | A45C 11/00 | |
| 9,668,556 B2* | 6/2017 | Senatori | A45C 11/00 | |
| 2011/0170252 A1* | 7/2011 | Jones | G06F 1/1632 | |
| | | | 361/679.09 | |
| 2012/0218690 A1* | 8/2012 | Okutsu | G06F 1/1616 | |
| | | | 361/679.01 | |
| 2013/0305489 A1* | 11/2013 | Liang | G06F 1/1681 | |
| | | | 16/277 | |
| 2014/0085792 A1* | 3/2014 | Lu | G06F 1/1662 | |
| | | | 361/679.08 | |
| 2014/0355192 A1 | 12/2014 | Lin | | |
| 2015/0022961 A1* | 1/2015 | Jenkins | G06F 1/1616 | |
| | | | 361/679.27 | |
| 2015/0043140 A1* | 2/2015 | Liang | G06F 1/1601 | |
| | | | 361/679.06 | |
| 2015/0043155 A1* | 2/2015 | Liang | G06F 1/1632 | |
| | | | 361/679.43 | |
| 2015/0055285 A1* | 2/2015 | Zheng | G06F 1/1656 | |
| | | | 361/679.26 | |
| 2015/0055290 A1* | 2/2015 | Lai | G06F 1/1632 | |
| | | | 361/679.44 | |
| 2015/0138712 A1* | 5/2015 | Solland | G06F 1/1652 | |
| | | | 361/679.27 | |
| 2015/0198975 A1* | 7/2015 | Chen | G06F 1/1632 | |
| | | | 361/679.44 | |
| 2015/0281413 A1* | 10/2015 | Longo | H04M 1/0212 | |
| | | | 455/575.3 | |
| 2015/0378394 A1* | 12/2015 | Chen | G06F 1/1632 | |
| | | | 361/679.43 | |
| 2016/0034001 A1* | 2/2016 | Huston | G06F 1/1656 | |
| | | | 345/179 | |
| 2016/0090767 A1* | 3/2016 | Park | E05D 11/10 | |
| | | | 16/319 | |
| 2017/0108893 A1* | 4/2017 | Arima | G06F 1/1616 | |

* cited by examiner

PORTABLE ELECTRONIC DEVICE CAPABLE OF PREVENTING A DISPLAY FROM FALLING

BACKGROUND OF THE INVENTION

1. Field of the Invention

The present invention relates to a portable electronic device, and more particularly, to a portable electronic device capable of preventing a display pivotally connecting to a keyboard from falling due to an excessive angle between the display and the keyboard.

2. Description of the Prior Art

A tablet computer can be equipped with an external keyboard to allow a user to use the tablet at an inclined angle like a laptop and to provide a convenient way to input commands. The tablet computer is usually detachably connected to the external keyboard by insertion of a female connector on a side of the tablet and a plug connector or a corresponding connector of the external keyboard or by attraction of two magnetic components on a side of the tablet and the external keyboard respectively. However, since the tablet computer is much heavier than the external keyboard, assembly of the tablet computer and the external keyboard may be driven by the tablet computer to fall rearwardly when an included angle between the tablet computer and the external keyboard is excessive. Therefore, there is another tablet computer equipped with a supporting structure disposed on a back side of the tablet computer in a hidden manner. When the tablet computer is pivotally unfolded away from the external keyboard, the supporting structure can be operated to protrude from the back side and support the tablet computer on a supporting surface, which prevents the tablet computer from falling over. However, since the supporting structure is disposed on the back side of the tablet computer, it is not easy for the user to find position of the supporting structure when it is desired to operate the supporting structure. Therefore, it is not convenient in use. Furthermore, in order to facilitate the user to operate the supporting structure, an auxiliary structure, such as a slot or a pin, is usually formed on the back side and located at a position near the supporting structure so that the user can use his/her finger to operate the auxiliary structure to actuate the supporting structure, which impacts on integrity and aesthetics appearance of the tablet computer.

SUMMARY OF THE INVENTION

Therefore, it is an objective of the present invention to provide a portable electronic device capable of preventing a display from falling for solving the aforementioned problems.

In order to achieve the aforementioned objective, the present invention discloses a portable electronic device. The portable electronic device includes a first module, a second module, a supporting frame, a pivoting mechanism, a moving magnetic component, an electromagnetic component, a detecting module, a power unit, and a control unit. The second module is rotatably connected to the first module. An accommodating slot is formed on a side of the second module. The supporting frame is pivoted to the second module. The supporting frame is selectively received inside the accommodating slot or pivotally unfolded away from the accommodating slot outwardly. The pivoting mechanism is disposed on a side of the accommodating slot and pivotally connecting the supporting frame and the second module. The pivoting mechanism provides a torsional resilient force for the supporting frame to bias the supporting frame to pivotally unfold away from the second module. The moving magnetic component is movably disposed inside the second module and having a first magnetic property. The electromagnetic component is disposed inside the second module and adjacent to the moving magnetic component. The electromagnetic component selectively drives the moving magnetic component to move toward or away from the electromagnetic component. The detecting module is for detecting an included angle between the first module and the second module. The power unit is coupled to the electromagnetic component and the detecting module. The power unit provides electricity for the electromagnetic component and the detecting module. The control unit is coupled to the power unit and the detecting module. When the control unit determines the included angle detected by the angle detecting module is greater than a predetermined angle, the control unit controls the power unit to provide a first current for the electromagnetic component, so that the electromagnetic component generates a first active magnetic property for magnetically repulsing or magnetically attracting the moving magnetic component with the first magnetic property to a first position. When the moving magnetic component is located at the first position, the torsional resilient force drives the supporting frame to pivotally unfold away from the second module, so as to support the second module on a supporting surface.

In summary, the present invention utilizes the control unit for controlling the power unit to provide electricity for the electromagnetic component when the control unit determines the included angle detected by the detecting module is greater than the predetermined angle, so as to magnetically repulse or magnetically attract the moving magnetic component to move. When the moving magnetic component moves to the first position, the supporting frame can be driven by the pivoting mechanism to pivotally unfolded away from the second module, so as to support the second module on the supporting surface, which prevents the second module from falling. Therefore, it is easy to operate the portable electronic device of the present invention. Furthermore, it is not required to dispose any structure, such as a slot or a pin, on the second module, and therefore, the portable electronic device of the present invention also enhances overall aesthesis appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
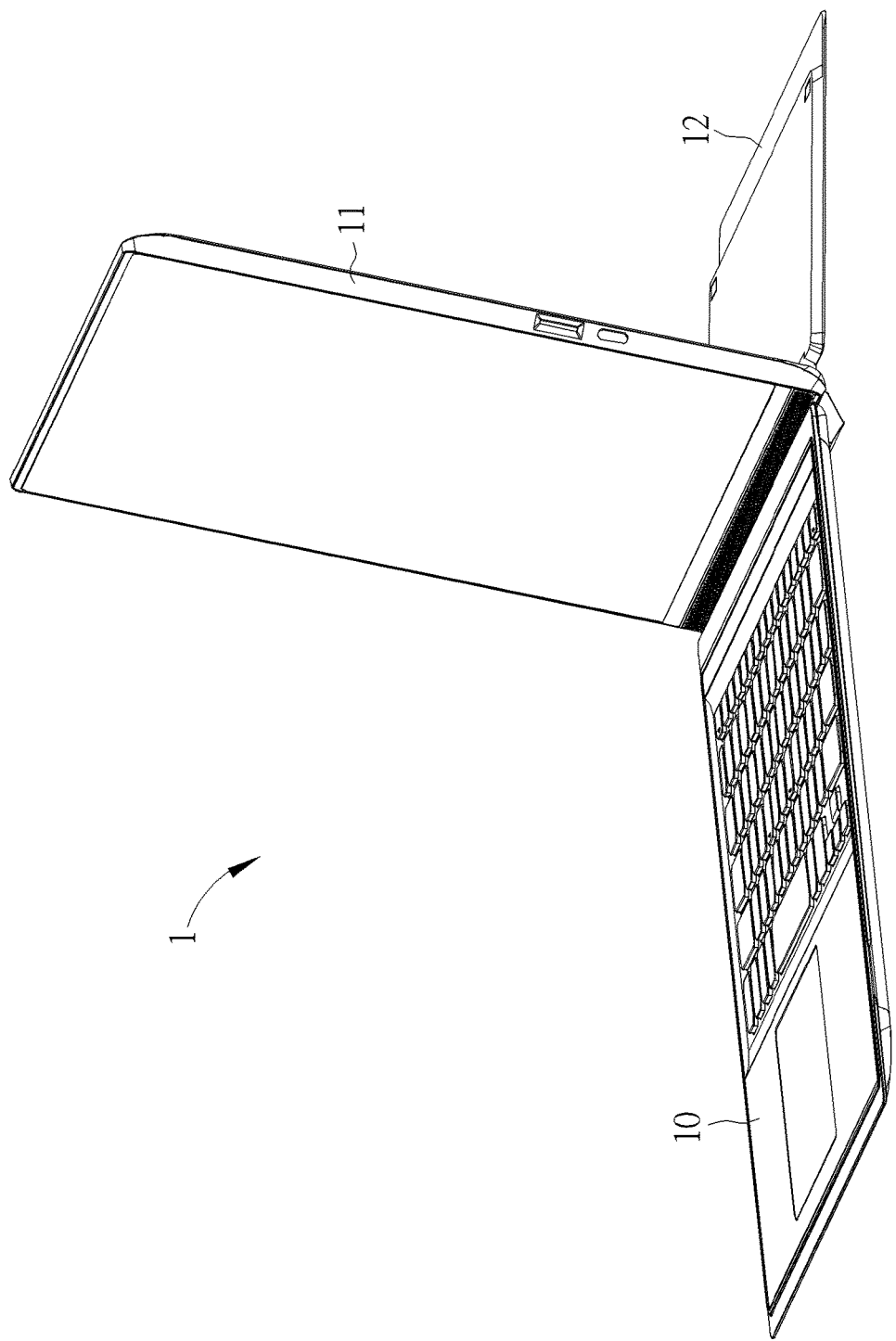
FIG. 1 is a schematic diagram of a portable electronic device according to a first embodiment of the present invention.
Figure 2:
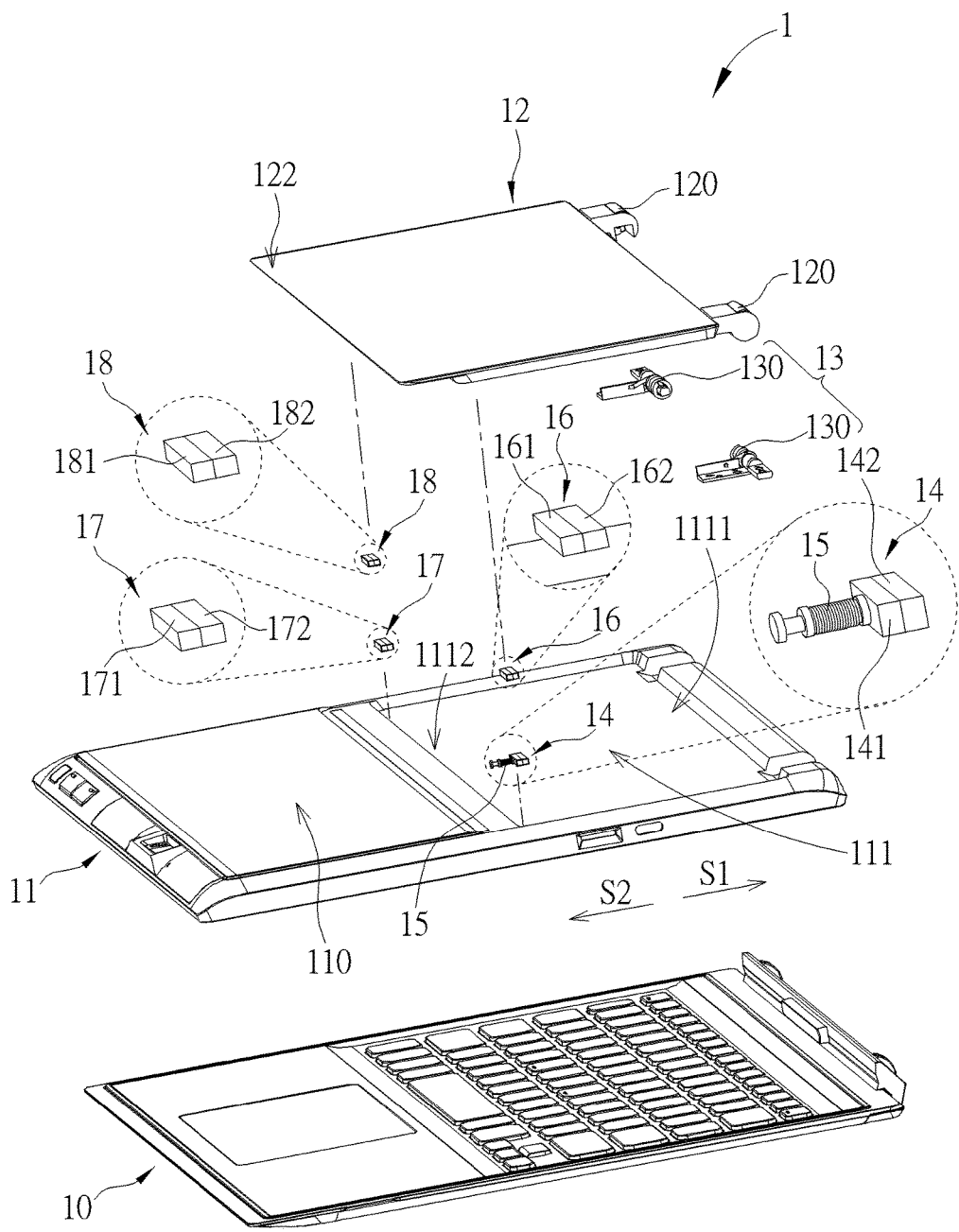
FIG. 2 is an exploded diagram of the portable electronic device according to the first embodiment of the present invention.

Please refer to FIG. 1 and FIG. 2. FIG. 1 is a schematic diagram of a portable electronic device 1 according to a first embodiment of the present invention. FIG. 2 is an exploded diagram of the portable electronic device 1 according to the first embodiment of the present invention. In this embodiment, the portable electronic device 1 can be an assembly of a tablet computer and a keyboard module or a laptop computer. However, it is not limited thereto. As shown in FIG. 1 and FIG. 2, the portable electronic device 1 includes a first module 10, a second module 11, a supporting frame 12, a pivoting mechanism 13, a moving magnetic component 14, an electromagnetic component 15, a first fixing magnetic component 16, a second fixing magnetic component 17, and a third fixing magnetic component 18. The second module 11 can be a tablet computer, and the first module 10 can be a keyboard module connected to the tablet computer. The first module 10 and the second module 11 also can be a host module and a display module of a laptop computer. The second module 11 is rotatably connected to the first module 10. An accommodating slot 111 is formed on a back side 110 of the second module 11. The pivoting mechanism 13 is disposed on a first side 1111 of the accommodating slot 111 of the second module 11. The supporting frame 12 is pivotally connected to the second module by the pivoting mechanism 13 and can be received in the accommodating slot 111. The pivoting mechanism 13 provides a torsional resilient force for the supporting frame 12 to bias the supporting frame 12 to pivotally unfold away from the second module 11 outwardly. For example, as shown in FIG. 2, in this embodiment, the pivoting mechanism 13 can include at least one torsional spring 130. The torsional spring 130 is forced to be deformed so as to generate the torsional resilient force for biasing the supporting frame 12 to pivotally unfold away from the second module 11 outwardly when the supporting frame 12 is rotated to be received in the accommodating slot 111. Furthermore, the supporting frame 12 can include at least one stopping structure 120 for abutting against the second module 11 when the supporting frame 12 pivotally unfolds away from the second module 11, so as to restrain an unfolding angle between the supporting frame 12 and the second module 11.

The moving magnetic component 14 is slidably disposed inside the second module 11 and located at a position near a second side 1112 of the accommodating slot 111. The moving magnetic component 14 has a first magnetic property. The electromagnetic component 15 is also disposed inside the second module 11 and located at a position near the second side 1112 of the accommodating slot 111. The electromagnetic component 15 and the moving magnetic component 14 are adjacent to each other and arranged along a direction. Therefore, the moving magnetic component 14 can be driven by the electromagnetic component 15 to linearly slide along the direction. The first fixing magnetic component 16 is disposed inside the supporting frame 12 and located at a position corresponding to a position of the moving magnetic component 14. The first fixing magnetic component 16 has a second magnetic property. The moving magnetic component 14 with the first magnetic property selectively magnetically repulses or magnetically attracts the first fixing magnetic component 16 with the second magnetic property by a magnetic repulsing force or a magnetic attracting force therebetween according to a relative position of the moving magnetic component 14 and the first fixing magnetic component 16. The second fixing magnetic component 17 is disposed inside the second side 1112 of the accommodating slot 111 and has a third magnetic property. The third fixing magnetic component 18 is disposed inside the supporting frame 12 and has a fourth magnetic property. The second fixing magnetic component 17 with the third magnetic property magnetically attracts the third fixing magnetic component 18 with the fourth magnetic property by a constant magnetic attracting force at all times. The moving magnetic component 14 and the second fixing magnetic component 17 are substantially located at positions spaced at the same distance from an edge of the second side 1112. The first fixing magnetic component 16 and the third fixing magnetic component 18 are substantially located at positions spaced at the same distance from an abutting end 112 of the supporting frame 12.

In this embodiment, the moving magnetic component 14 has a first magnetic pole 141 and a second magnetic pole 142 opposite to the first magnetic pole 141. The first magnetic pole 141 and the second magnetic pole 142 are sequentially arranged along a first sliding direction S1 of the moving magnetic component 14 to define the first magnetic property. The first fixing magnetic component 16 has a third magnetic pole 161 and a fourth magnetic pole 162 opposite to the third magnetic pole 161. The third magnetic pole 161 and the fourth magnetic pole 162 are sequentially arranged along the first sliding direction S1 to define the second magnetic property. The first magnetic pole 141 is identical to the third magnetic pole 161 but opposite to the fourth magnetic pole 162. The second magnetic pole 142 is identical to the fourth magnetic pole 162 but opposite to the third magnetic pole 161. When the moving magnetic component 14 and the first fixing magnetic component 16 are completely aligned with each other, i.e., the first magnetic pole 141 is aligned with the third magnetic pole 161 and the second magnetic pole 142 is aligned with the fourth magnetic pole 162, the magnetic repulsing force is generated between the moving magnetic component 14 with the first magnetic property and the first fixing magnetic component 16 with the second magnetic property. On the other hand, when the moving magnetic component 14 is misaligned with and partially deviated from the first fixing magnetic component 16, i.e., the second magnetic pole 142 is aligned with the third magnetic pole 161 of the first fixing magnetic component 16 and the first magnetic pole 141 is not aligned with and completely deviated from the first fixing magnetic component 16, the magnetic attracting force is generated between the moving magnetic component 14 with the first magnetic property and the first fixing magnetic component 16 with the second magnetic property.

The second fixing magnetic component 17 has a fifth magnetic pole 171 and a sixth magnetic pole 172 opposite to the fifth magnetic pole 171. The fifth magnetic pole 171 and the sixth magnetic pole 172 are sequentially arranged along the first sliding direction S1 to define the third magnetic property. The third fixing magnetic component 18 has a seventh magnetic pole 181 and an eighth magnetic pole 182 opposite to the seventh magnetic pole 181. The seventh magnetic pole 181 and the eighth magnetic pole 182 are sequentially arranged along the first sliding direction S1 to define the fourth magnetic property. The fifth magnetic pole 171 is identical to the eighth magnetic pole 182 but opposite to the seventh magnetic pole 181. The sixth magnetic pole 172 is identical to the seventh magnetic pole 181 but opposite to the eighth magnetic pole 182. The third fixing magnetic component 18 is completely aligned with the second fixing magnetic component 17 at all times. That is, in any case, the fifth magnetic pole 171 is aligned with the seventh magnetic pole 181, and the sixth magnetic pole 172 is aligned with the eighth magnetic pole 182. Therefore, the constant magnetic attracting force is generated between the second fixing magnetic component 17 with the third magnetic property and the third fixing magnetic component 18 with the fourth magnetic property at all times. However, the first magnetic property, the second magnetic property, the third magnetic property, and the fourth magnetic property of the present invention are not limited thereto. In other words, any structure or any mechanism which can generate the magnetic attracting force or the magnetic repulsing force between the moving magnetic component 14 with the first magnetic property and the first fixing magnetic component 16 with the second magnetic property as well as generate the constant magnetic attracting force between the second fixing magnetic component 17 with the third magnetic property and the third fixing magnetic component 18 with the fourth magnetic property is within the scope of the present invention.

Figure 3:
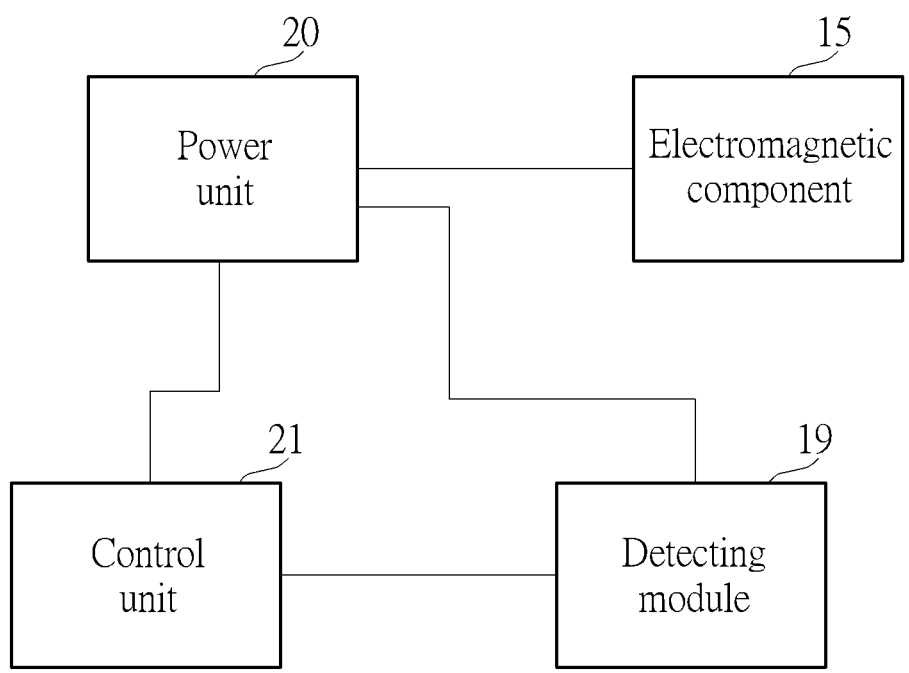
FIG. 3 is a functional block diagram of the portable electronic device according to the first embodiment of the present invention.

Please refer to FIG. 3. FIG. 3 is a functional block diagram of the portable electronic device 1 according to the first embodiment of the present invention. The portable electronic device 1 further includes a detecting module 19, a power unit 20, and a control unit 21. The detecting module 19 is for detecting an included angle between the first module 10 and the second module 11. The power unit 20 is coupled to the electromagnetic component 15 and the detecting module 19 for providing electricity for the electromagnetic component 15 and the detecting module 19. The control unit 21 is coupled to the power unit 20 and the detecting module 19. The control unit 21 determines a relation between the included angle detected by the detecting module 19 and a predetermined angle and controls the power unit 20 to provide electricity for the electromagnetic component 15 to magnetically repulse or magnetically attract the moving magnetic component 14 to slide according to the relation, so as to allow the supporting frame 12 to pivotally unfold away from the second module 11 or restrain the supporting frame 12 from pivotally unfolding away from the second module 11. In this embodiment, the detecting module 19 can include two sets of G sensors and gyroscopes. One and the other one of the two sets of G sensors and gyroscopes are respectively disposed on the second module 11 and the first module 10 for detecting disposing angles of the second module 11 and the first module 10, so as to generate the included angle between the second module 11 and the first module 10. However, the detecting module 19 of the present invention is not limited thereto. In another embodiment, the detecting module 19 also can include a potentiometer, a light sensor, or a magnetic sensor for generating the included angle between the second module 11 and the first module 10 according to a detecting result thereof.

Figure 4:
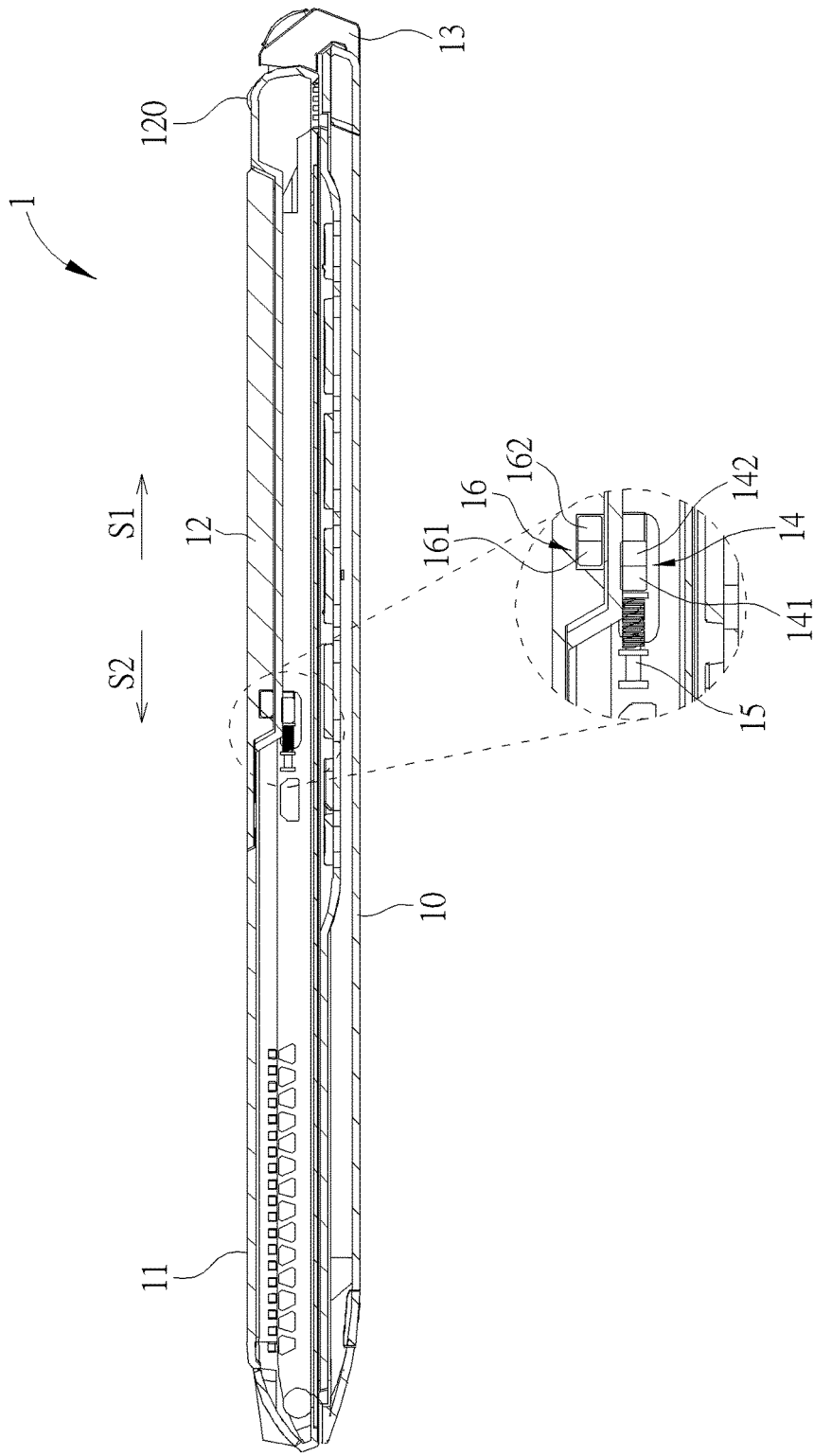
FIG. 4 to FIG. 6 are diagrams of the portable electronic device at different statuses according to the first embodiment of the present invention.
Figure 5:
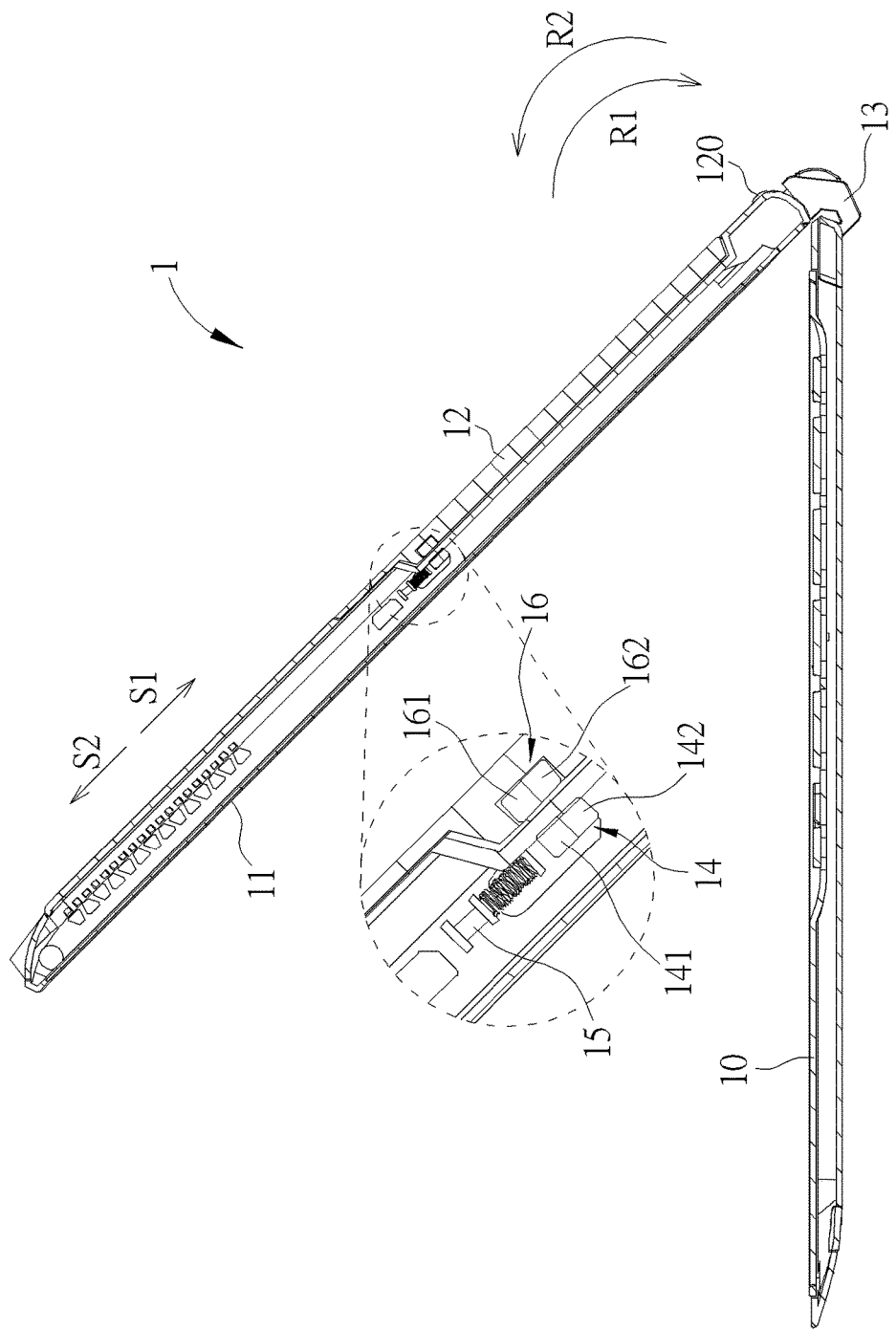
Figure 6:
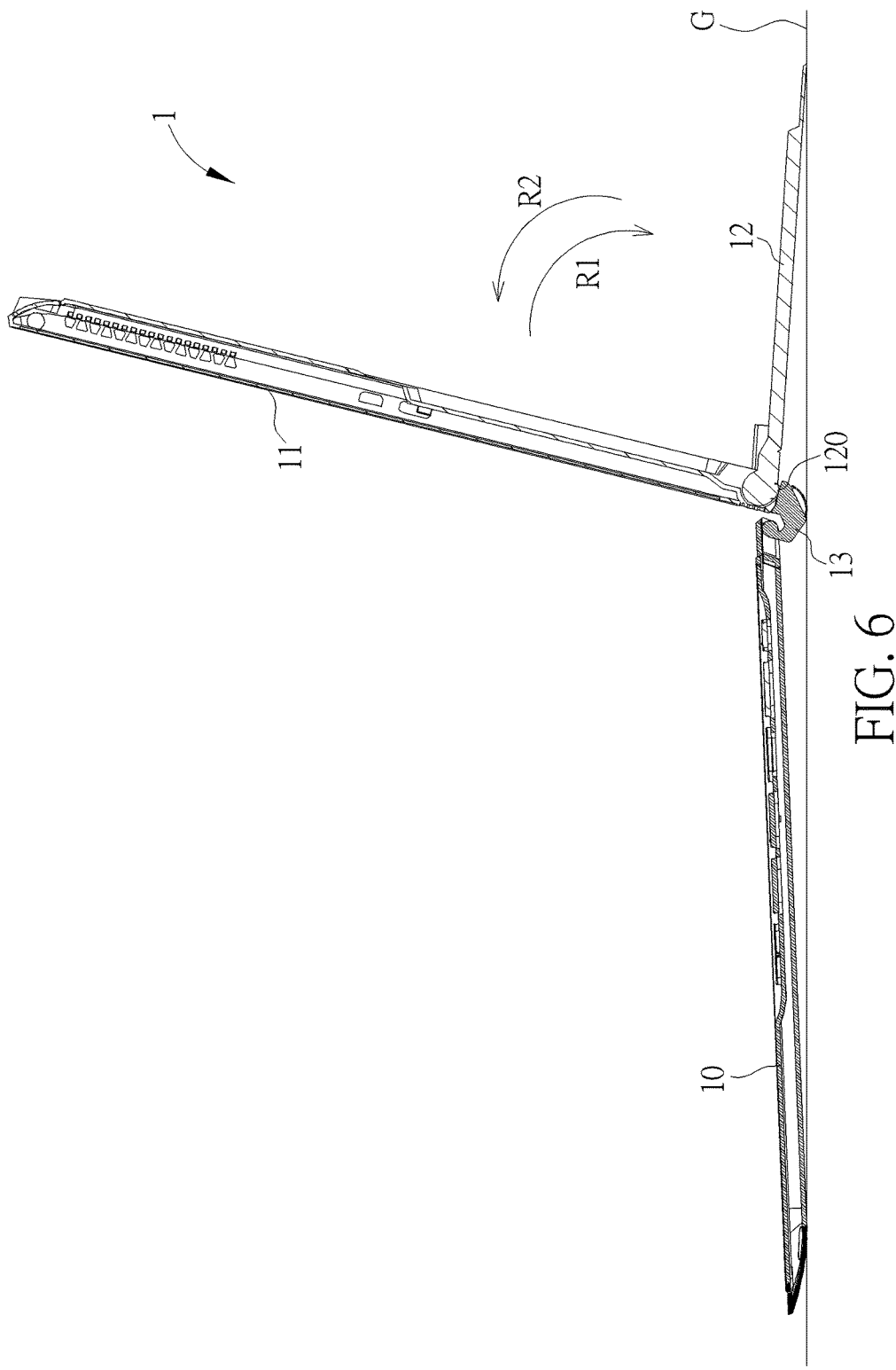

Please refer to FIG. 4 to FIG. 6. FIG. 4 to FIG. 6 are diagrams of the portable electronic device 1 at different statuses according to the first embodiment of the present invention. In this embodiment, the predetermined angle can be configured to 45 degrees. When the control unit 21 determines the included angle detected by the detecting module 19 is greater than the predetermined angle (45 degrees), i.e., when the second module 11 is unfolded relative to the first module 10 from a position shown in FIG. 4 to another position shown in FIG. 5, the control unit 21 controls the power unit 20 to provide a first current for the electromagnetic component 15, so that the electromagnetic component 15 generates a first active magnetic property to drive the moving magnetic component 14 to slide along the first sliding direction S1 to a first position shown in FIG. 5. When the moving magnetic component 14 is located at the first position, the moving magnetic component 14 and the first fixing magnetic component 16 are completely aligned with each other, i.e., the first magnetic pole 141 is aligned with the third magnetic pole 161, and the second magnetic pole 142 is aligned with the fourth magnetic pole 162. Therefore, the magnetic repulsing force is generated between the moving magnetic component 14 with the first magnetic property and the first fixing magnetic component 16 with the second magnetic property. Since a resultant force of the torsional resilient force of the pivoting mechanism 13 and the magnetic repulsing force between the moving magnetic component 14 and the first fixing magnetic component 16 is greater than the constant magnetic attracting force between the second fixing magnetic component 17 and the third fixing magnetic component 18, the supporting frame 12 can be driven to pivotally unfold away from the second module 11 along a first pivoting direction R1. During a process of unfolding the second module 11 relative to the first module 10, the supporting frame 12 pivotally unfolds away from the second module 11 along the first pivoting direction R1 until the stopping structure 120 abuts against the second module 11, so that the portable electronic device 1 can be switched from a status shown in FIG. 5 to another status shown in FIG. 6. At this moment, the unfolded supporting frame 12 can support the second module 11 on a supporting surface G, which prevents the second module 11 from falling.

On the other hand, when it is desired to fold the supporting frame 12 relative to the second module 11, the second module 11 is operated to fold relative to the first module 10 along a second pivoting direction R2 opposite to the first pivoting direction R1. When the control unit 21 determines the included angle detected by the detecting module 19 is less than the predetermined angle during a process of folding the second module 11 relative to the first module 10, the control unit 21 controls the power unit 20 to stop providing the first current or provide a second current opposite to the first current, so that the electromagnetic component 15 magnetically attracts the moving magnetic component 14 to slide to a second position along a second sliding direction S2 opposite to the first sliding direction S1. At this moment, the supporting frame 12 can be operated to fold relative to the second module 11 and be received in the accommodating slot 111, so that the portable electronic device 1 can be located at a status shown in FIG. 4. When the moving magnetic component 14 is located at the second position, the second magnetic pole 142 of the moving magnetic component 14 is aligned with the third magnetic pole 161 of the first fixing magnetic component 16, and the first magnetic pole 142 of the moving magnetic component 14 is not aligned with and completely deviated from the first fixing magnetic component 16. Therefore, the magnetic attracting force is generated between the moving magnetic component 14 with the first magnetic property and the first fixing magnetic component 16 with the second magnetic property. Since the torsional resilient force of the pivoting mechanism 13 is less than a resultant force of the constant magnetic attracting force between the second fixing magnetic component 17 and the third fixing magnetic component 18 and the magnetic attracting force between the moving magnetic component 14 and the first fixing magnetic component 16, the supporting frame 12 can be restrained from pivotally unfolding away from the second module 11.

However, relations among the torsional resilient force, the constant magnetic attracting force, the magnetic attracting force, and the magnetic repulsing force are not limited to this embodiment. It depends on practical demands. For example, in another embodiment, the second fixing magnetic component 17 and the third fixing magnetic component 18 can be omitted. When the moving magnetic component 14 is located at the first position, the resultant force of the torsional resilient force of the pivoting mechanism 13 and the magnetic repulsing force between the moving magnetic component 14 and the first fixing magnetic component 16 drives the supporting frame 12 to pivotally unfold away from the second module 11 along the first pivoting direction R1. When the moving magnetic component 14 is located at the second position, the torsional resilient force is less than the magnetic attracting force between the moving magnetic component 14 and the first fixing magnetic component 16, so that the supporting frame 12 is retrained from pivotally unfolding away from the second module 11. Furthermore, the first active magnetic property of the electromagnetic component 15 is not limited to this embodiment. That is, the electromagnetic component 15 also can be disposed on a side of the moving magnetic component 14 near the pivoting mechanism 13. The electromagnetic component 15 with the first active magnetic property magnetically attracts the moving magnetic component 14 with the first magnetic property to slide to the first position and magnetically repulses the moving magnetic component 14 with the first magnetic property to slide to the second position. It depends on practical design demands.

Figure 7:
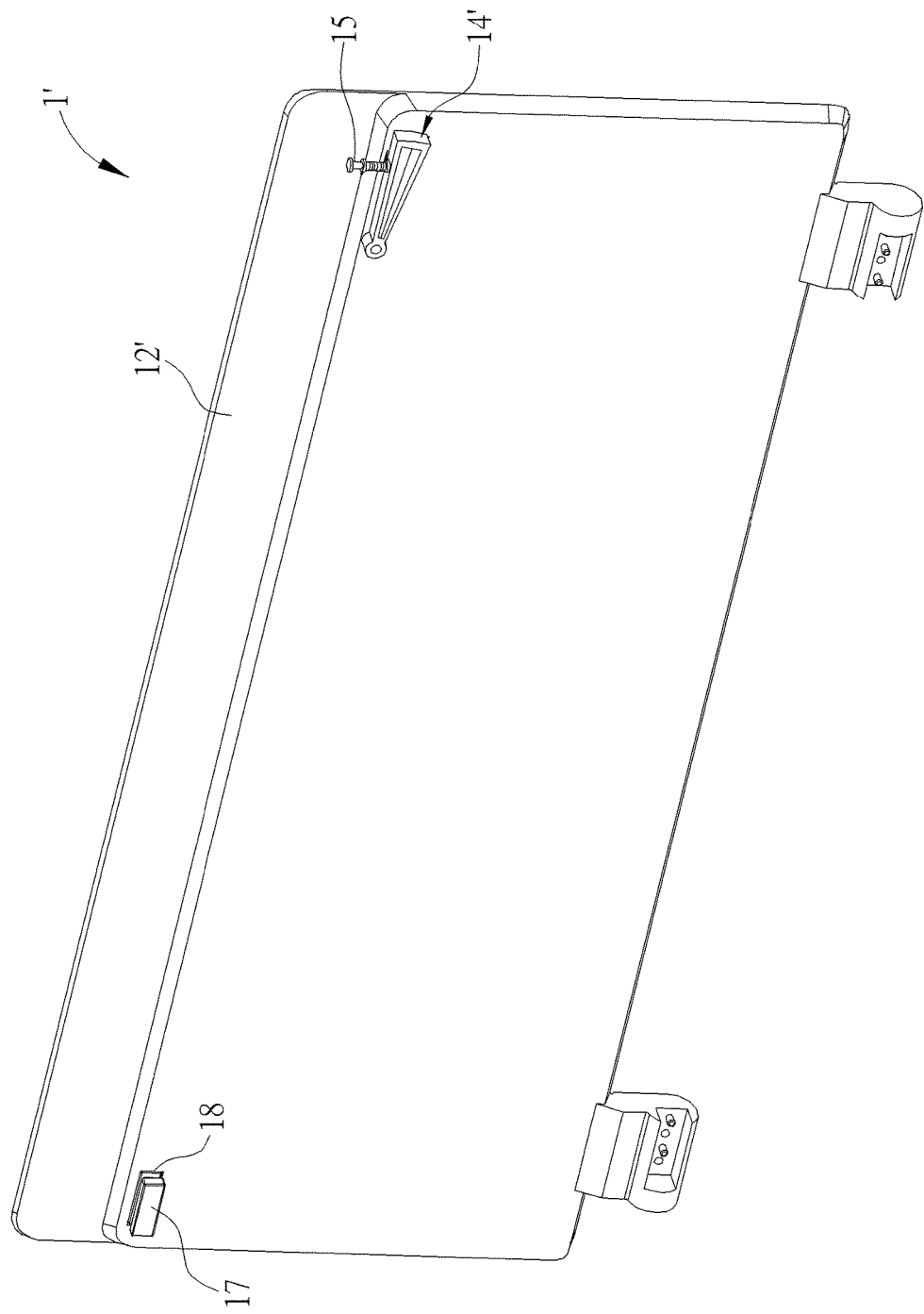
FIG. 7 is a partial diagram of a portable electronic device according to a second embodiment of the present invention.

Please refer to FIG. 7. FIG. 7 is a partial diagram of a portable electronic device 1' according to a second embodiment of the present invention. For simplicity, FIG. 7 only illustrates the difference between the portable electronic device 1' of the second embodiment and the portable electronic device 1 of the first embodiment. As shown in FIG. 7, a moving magnetic component 14' of the portable electronic device 1' is rotatably disposed inside the second module 11. In other words, the control unit 21 controls the power unit 20 to provide electricity for the electromagnetic component 15 to magnetically attract or magnetically repulse the moving magnetic component 14' to rotate between the first position and the second position, so as to allow the supporting frame 12 to pivotally unfold away from the second module 11 or restrain the supporting frame 12 from pivotally unfolding away from the second module 11.

Figure 8:
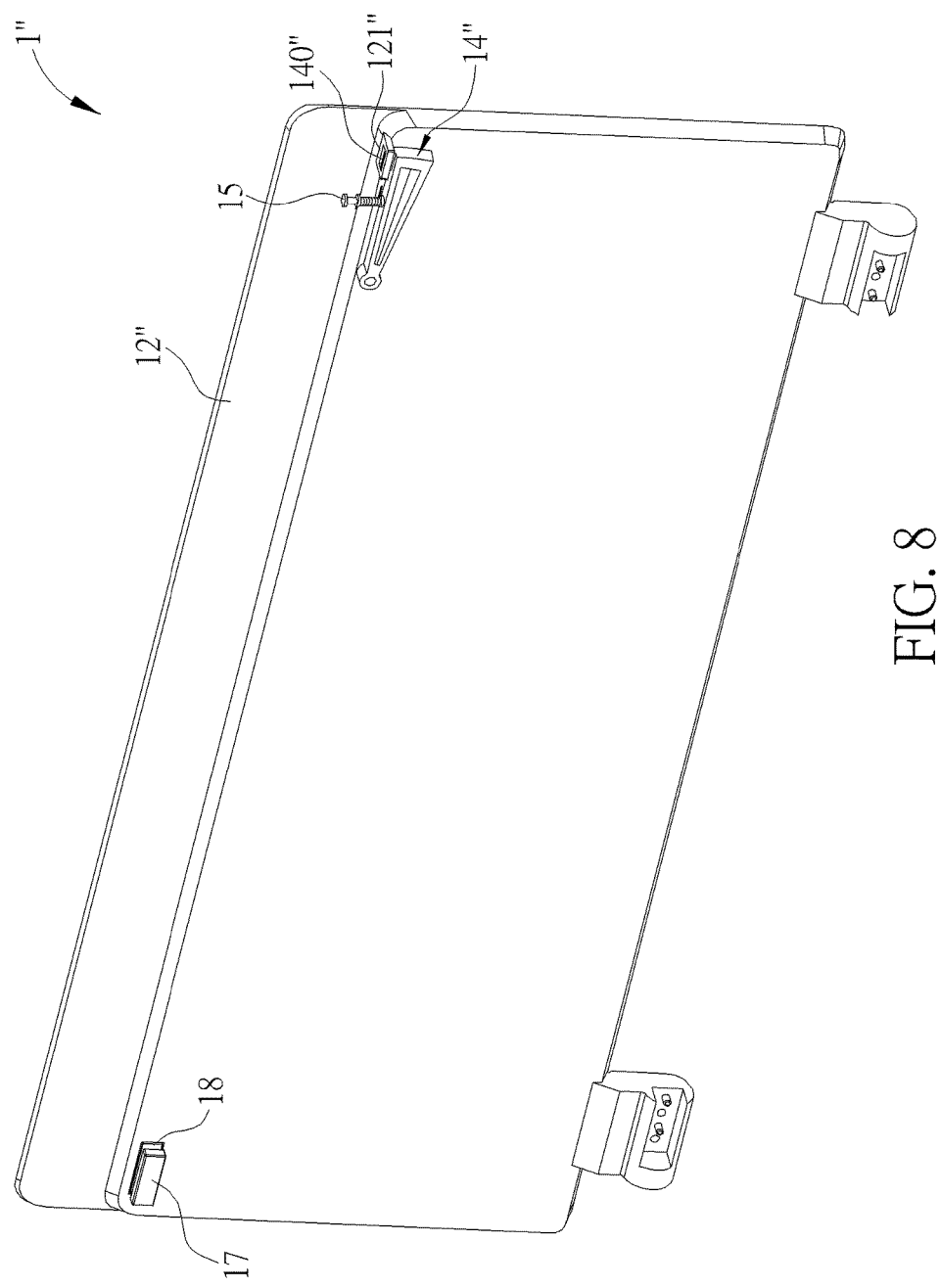
FIG. 8 is a partial diagram of a portable electronic device according to a third embodiment of the present invention.

Please refer to FIG. 8. FIG. 8 is a partial diagram of a portable electronic device 1" according to a third embodiment of the present invention. For simplicity, FIG. 8 only illustrates the difference between the portable electronic device 1" of the third embodiment and the portable electronic devices 1, 1' of the aforementioned embodiments. As shown in FIG. 8, a moving magnetic component 14" of the portable electronic device 1" is rotatably disposed inside the second module 11. The moving magnetic component 14" includes an engaging hook 140". An engaging portion 121" is formed on a supporting frame 12". The control unit 21 controls the power unit 20 to provide electricity for the electromagnetic component 15 to drive the moving magnetic component 14" to rotate according to the included angle detected by the detecting module 19, so as to drive the engaging hook 140" to engage with or disengage from the engaging portion 121". In other words, instead of magnetic attracting mechanism or magnetic repulsing mechanism between the moving magnetic component and the first fixing magnetic component of the aforementioned embodiment, the portable electronic device 1" of the third embodiment utilizes engagement or disengagement of the engaging hook 140" and the engaging portion 121" for allowing the supporting frame 12" to pivotally unfold away from the second module 11 or restrain the supporting frame 12" from pivotally unfolding away from the second module 11. When the engaging hook 140" disengages from the engaging portion 121", the supporting frame 12" can be driven by the torsional resilient force of the pivoting mechanism 13 to pivotally unfold away from the second module 11. When the engaging hook 140" engages with the engaging portion 121", the supporting frame 12" is restrained from pivotally unfolding away from the second module 11. Therefore, the first fixing magnetic component of the aforementioned embodiment can be omitted in the third embodiment.

Figure 9:
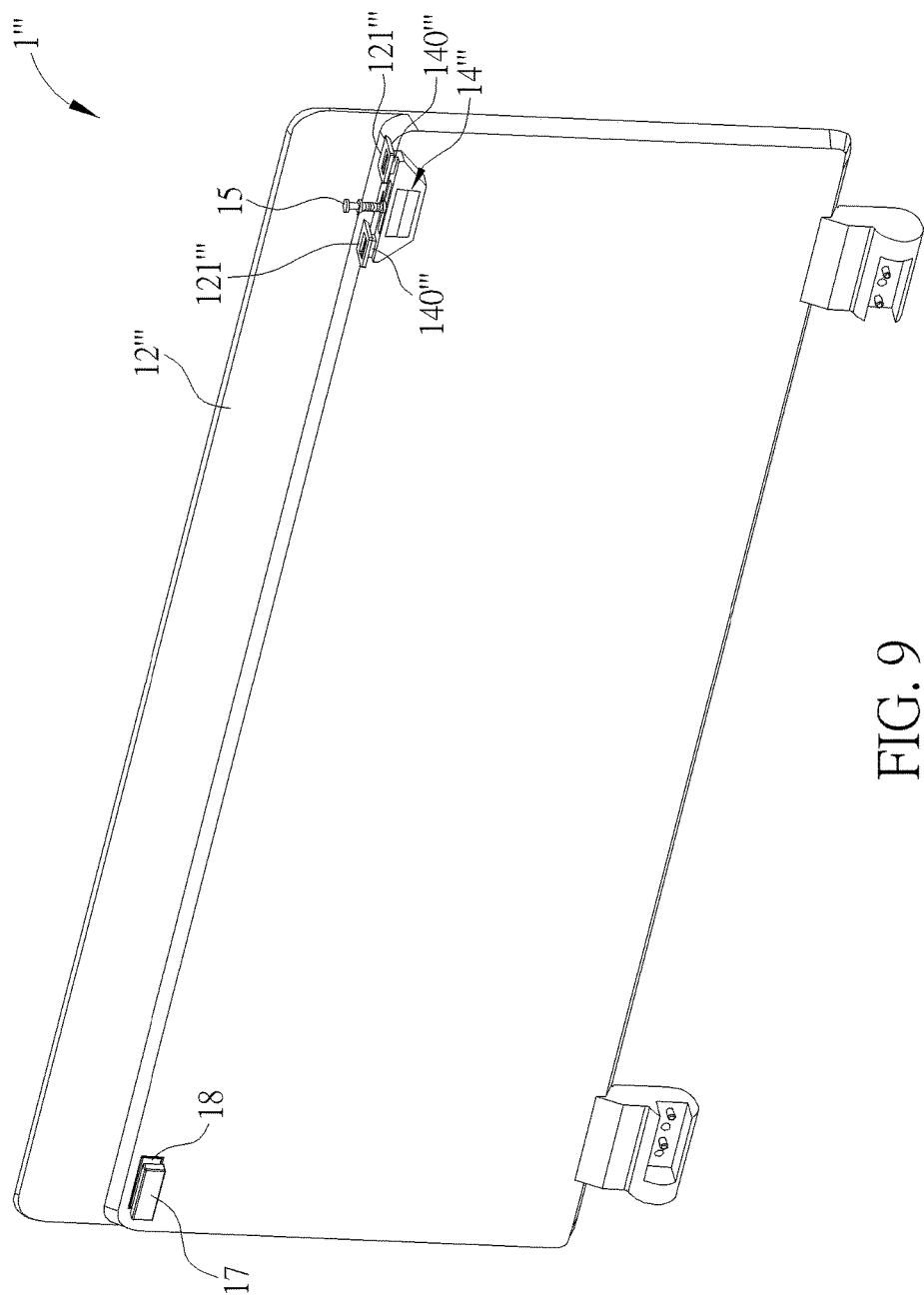
FIG. 9 is a partial diagram of a portable electronic device according to a fourth embodiment of the present invention.

Please refer to FIG. 9. FIG. 9 is a partial diagram of a portable electronic device 1''' according to a fourth embodiment of the present invention. For simplicity, FIG. 9 only illustrates the difference between the portable electronic device 1''' of the third embodiment and the portable electronic devices 1, 1', 1" of the aforementioned embodiment. As shown in FIG. 9, a moving magnetic component 14''' of the portable electronic device 1''' of the fourth embodiment is slidably disposed inside the second module 11. The moving magnetic component 14''' includes two engaging hooks 140'''. Two engaging portions 121''' are formed on the supporting frame 12''. The control unit 21 controls the power unit 20 to provide electricity for the electromagnetic component 15 to drive the moving magnetic component 14''' to slide according to the included angle detected by the detecting module 19, so as to drive the two engaging hooks 140" to engage with or disengage from the two engaging portions 121''' respectively. In other words, similar to the third embodiment, the portable electronic device 1''' of the fourth embodiment also utilizes engagement or disengagement of the engaging hook and the engaging portion instead of the magnetic attracting mechanism or the magnetic repulsing mechanism between the moving magnetic component and the first fixing magnetic component of the aforementioned embodiment for allowing the supporting frame 12''' to pivotally unfold away from the second module 11 or restraining the supporting frame 12''' from pivotally unfolding away from the second module 11. Different from the engaging hook 140" of the third embodiment, the engaging hook 140''' of this embodiment engages with or disengages from the engaging portion 121''' by sliding of the moving magnetic component 14''. When the engaging hook 140''' disengages from the engaging portion 121', the supporting frame 12''' can be driven by the torsional resilient force to pivotally unfold away from the second module 11. When the engaging hook 140''' engages with the engaging portion 121', the supporting frame 12''' can be restrained from pivotally unfolding away from the second module 11. Therefore, the first fixing magnetic component of the aforementioned embodiment can be omitted in the fourth embodiment, either.

In contrast to the prior art, the present invention utilizes the control unit for controlling the power unit to provide electricity for the electromagnetic component when the control unit determines the included angle detected by the detecting module is greater than the predetermined angle, so as to magnetically repulse or magnetically attract the moving magnetic component to move. When the moving magnetic component moves to the first position, the supporting frame can be driven by the pivoting mechanism to pivotally unfolded away from the second module, so as to support the second module on the supporting surface, which prevents the second module from falling. Therefore, it is easy to operate the portable electronic device of the present invention. Furthermore, it is not required to dispose any structure, such as a slot or a pin, on the second module, and therefore, the portable electronic device of the present invention also enhances overall appearance aesthesis.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device capable of preventing a display from falling, the portable electronic device comprising:
   a first module;
   a second module rotatably connected to the first module, an accommodating slot being formed on a side of the second module;
   a supporting frame pivoted to the second module, the supporting frame being selectively received inside the accommodating slot or pivotally unfolded away from the accommodating slot outwardly;
   a pivoting mechanism disposed on a side of the accommodating slot and pivotally connecting the supporting frame and the second module, the pivoting mechanism providing a torsional resilient force for the supporting frame to bias the supporting frame to pivotally unfold away from the second module;
   a moving magnetic component movably disposed inside the second module and having a first magnetic property;
   an electromagnetic component disposed inside the second module and adjacent to the moving magnetic component, the electromagnetic component selectively driving the moving magnetic component to move toward or away from the electromagnetic component;
   a detecting module for detecting an included angle between the first module and the second module;
   a power unit coupled to the electromagnetic component and the detecting module, the power unit providing electricity for the electromagnetic component and the detecting module; and
   a control unit coupled to the power unit and the detecting module, when the control unit determines the included angle detected by the angle detecting module is greater than a predetermined angle, the control unit controlling the power unit to provide a first current for the electromagnetic component, so that the electromagnetic component generates a first active magnetic property for magnetically repulsing or magnetically attracting the moving magnetic component with the first magnetic property to a first position, when the moving magnetic component is located at the first position, the torsional resilient force driving the supporting frame to pivotally unfold away from the second module, so as to support the second module on a supporting surface.

2. The portable electronic device of claim 1, further comprising a first fixing magnetic component disposed inside the supporting frame and located at a position corresponding to a position of the moving magnetic component, the first fixing magnetic component having a second magnetic property, when the moving magnetic component is located at the first position, a magnetic repulsing force being generated between the moving magnetic component with the first magnetic property and the first fixing magnetic component with the second magnetic property, so that a resultant force of the torsional resilient force and the magnetic repulsing force drives the supporting frame to pivotally unfold away from the second module.

3. The portable electronic device of claim 2, further comprising:
   a second fixing magnetic component disposed inside the second module and having a third magnetic property; and
   a third fixing magnetic component disposed inside the supporting frame and having a fourth magnetic property;
   wherein a constant magnetic attracting force is generated between the second fixing magnetic component with the third magnetic property and the third fixing magnetic component with the fourth magnetic property at all times, when the moving magnetic component is located at the first position, the resultant force of the torsional resilient force and the magnetic repulsing force is greater than the constant magnetic attracting force so as to drive the supporting frame to pivotally unfold away from the second module.

4. The portable electronic device of claim 3, wherein when the control unit determines the included angle detected by the detecting module is less than the predetermined angle, the control unit controls the power unit to stop providing the first current or to provide a second current opposite to the first current for the electromagnetic component, so as to drive the moving magnetic component to move to a second position, when the moving magnetic component is located at the second position, a magnetic attracting force is generated between the moving magnetic component with the first magnetic property and the first fixing magnetic component with the second magnetic property, so that a resultant of the constant magnetic attracting force and the magnetic attracting force is greater than the torsional resilient force for restraining the supporting frame from pivotally unfolding away from the second module.

5. The portable electronic device of claim 2, wherein when the control unit determines the included angle detected by the detecting module is less than the predetermined angle, the control unit controls the power unit to stop providing the first current or to provide a second current opposite to the first current for the electromagnetic component, so as to drive the moving magnetic component to a second position oppositely, when the moving magnetic component is located at the second position, a magnetic attracting force is generated between the moving magnetic component with the first magnetic property and the first fixing magnetic component with the second magnetic property, so that the magnetic attracting force is greater than the torsional resilient force for restraining the supporting frame from pivotally unfolding away from the second module.

6. The portable electronic device of claim 1, wherein the moving magnetic component is slidably disposed inside the second module.

7. The portable electronic device of claim 6, wherein an engaging portion is formed on the supporting frame, the moving magnetic component comprises an engaging hook, when the electromagnetic component drives the moving magnetic component to slide to the first position, the engaging hook is driven to disengage from the engaging portion, so that the torsional resilient force drives the supporting frame to pivotally unfold away from the second module.

8. The portable electronic device of claim 7, wherein when the control unit determines the included angle detected by the detecting module is less than the predetermined angle, the control unit controls the power unit to stop providing the first current or provide a second current opposite to the first current for the electromagnetic component to drive the moving magnetic component to slide to a second position and to drive the engaging hook to engage with the engaging portion, so as to restrain the supporting frame from pivotally unfolding away from the second module.

9. The portable electronic device of claim 1, wherein the moving magnetic component is rotatably disposed inside the second module.

10. The portable electronic device of claim 9, wherein an engaging portion is formed on the supporting frame, the moving magnetic component comprises an engaging hook, when the electromagnetic component drives the moving magnetic component to rotate to the first position, the engaging hook is driven to disengage from the engaging portion, so that the torsional resilient force drives the supporting frame to pivotally unfold away from the second module.

11. The portable electronic device of claim 10, wherein when the control unit determines the included angle detected by the detecting unit is less than the predetermined angle, the control unit controls the power unit to stop providing the first current or provide a second current opposite to the first current for the electromagnetic component to drive the moving magnetic component to rotate to a second position and to drive the engaging hook to engage with the engaging portion, so as to restrain the supporting frame from pivotally unfolding away from the second module.

12. The portable electronic device of claim 1, wherein the supporting frame comprises a stopping structure for abutting against the second module when the supporting frame pivotally unfolds away from the second module, so as to restrain an unfolding angle between the supporting frame and the second module.

* * * * *